United States Patent Office 2,762,833
Patented Sept. 11, 1956

2,762,833

PROCESS FOR PREPARING TRICYANO-VINYLPHENOLS

Richard Edwin Heckert, Wilmington, Del., assignor to E. I. du Pont de Nemours and Company, Wilmington, Del., a corporation of Delaware No Drawing. Application September 28, 1953, Serial No. 382,858

6 Claims. (Cl. 260—465)

This invention relates to the preparation of aromatic compounds and, more particularly, to a process of preparing C-tricyanovinylphenols.

The present invention is concerned with the process of preparing phenols having the characteristic grouping $(CN)_2C=C(CN)C$ which compounds are C-tricyanovinylphenols. These compounds are new and are claimed in applicant's application Serial No. 382,857, filed of even date herewith and now abandoned, and entitled "Process of Preparing Organic Compounds and a New Class of Organic Compounds." They are to be distinguished from phenols having the characteristic grouping $(CN)_2C=C(CN)O$ which compounds are O-tricyanovinylphenols or they may be termed tricyanovinyl phenyl ethers. Both types of compounds contain the tricyanovinyl group $(CN)_2C=C(CN)—$ but in the first instance it is bonded to carbon and in the second to oxygen.

An object of the present invention is to provide a process of preparing C-tricyanovinylphenols. Other objects will be apparent from the description of the invention given hereinafter.

The above objects are accomplished according to the present invention by reacting tetracyanoethylene with phenols containing at least one hydrogen bonded to annular carbon at a position other than meta in the phenol ring, i. e., phenols having at least one hydrogen bonded to annular carbon at the ortho or para position to the hydroxy group, to form C-tricyanovinylphenols.

Tetracyanoethylene, $(CN)_2C=C(CN)_2$, can be prepared by the reaction of sulfur monochloride with malononitrile, conveniently in the presence of an inert liquid diluent, and thereafter separating the tetracyanoethylene formed from the reaction mixture.

It has now been found that tetracyanoethylene will readily react under mild conditions with phenols containing at least one hydrogen bonded to annular carbon at a position other than meta in the phenol ring, to give highly useful C-tricyanovinylphenols which are characterized by the grouping $(CN)_2C=C(CN)C$.

The process for preparing C-tricyanovinylphenols by the reaction of tetracyanoethylene with phenols takes place by a condensation in which hydrogen cyanide is formed as a by-product and the tricyanovinyl group replaces hydrogen as a substituent on annular carbon of the phenol. This reaction can be carried out under a wide variety of conditions. For example, if the phenol is a solid at room temperature, as is tetracyanoethylene, the two solids may be ground together under pulverizing conditions for several days at room temperature until the reaction is complete. To obtain a more rapid reaction, the two solids may be melted together and stirred.

Since the reaction involved in the process of this invention is exothermic, the reaction may be carried out to advantage in the presence of a solvent or diluent, such as water or an organic liquid, to facilitate suitable dissipation of the heat of reaction. Preferably, an organic liquid inert to the reactants and capable of dissolving tetracyanoethylene is used. Relatively low boiling solvents such as tetrahydrofuran, benzene, alcohol and acetone, in which tetracyanoethylene is readily soluble, can be used although such solvents as chloroform and diethyl ether in which tetracyanoethylene is only sparingly soluble, are useful. The presence of a solvent is a convenience and is not fundamental to the chemistry of the reaction.

A wide range of temperatures can be used for carrying out this reaction. Temperatures from room temperature up to the decomposition temperature of the reactants and product can be employed. However, for convenience and for the purpose of shortening the reaction time, it is preferred to carry out the reaction in the temperature range from 40° C. to 150° C. Pressure is not critical and normally the process will be carried out substantially at atmospheric pressure. While time affects the degree of completion of the reaction, it is not otherwise critical.

The reaction of tetracyanoethylene with phenols can be carried out under acidic, neutral, or alkaline conditions to give C-tricyanovinylphenols. Of these three, alkaline conditions tend to give higher yields of the C-tricyanovinylphenol.

Illustrating a preferred embodiment of carrying out the invention, equal molecular quantities of tetracyanoethylene and 2,6-dimethylphenol are dissolved in tetrahydrofuran and an alkaline material is added. The resulting solution is heated at reflux for several hours and, on cooling, 2,6-dimethyl-4-tricyanovinylphenol separates as a crystalline solid.

The following examples, in which all proportions are by weight unless otherwise stated, illustrate specific embodiments of the process of this invention.

All absorption and molecular extinction data shown herein were measured on a Cary Recording Spectrophotometer built by the Applied Physics Corporation of Pasadena, California. The terms used are explained by Brode, W. R., "Chemical Spectroscopy," John Wiley & Sons, New York, 1939, page 4.

Example I

To 50 parts of tetracyanoethylene and 48 parts of 2,6-dimethylphenol in 266 parts of tetrahydrofuran is added 49 parts of pyridine. The pyridine, added dropwise causes the solution to warm nearly to boiling. The solution is refluxed for two hours and is allowed to stand three days. Black crystals which separate are collected on a filter and washed by suspension in ether; weight, 27 parts; M. P., 184–5° C. (dec., preheated Fisher block). On heating or exposure to air, the crystals become red and finally orange. The mother liquor and the ether washes are evaporated to dryness to obtain an additional 47 parts of black crystals. The solids are combined and recrystallized twice from aqueous acetic acid. The product, 2,6-dimethyl-4-tricyanovinylphenol, obtained as orange needles, melts at 182–3° C. (dec.); weight, 25 parts.

Analysis.—Calc. for $C_{13}H_9N_3O$: C, 69.9; H, 4.06; N, 18.8. Found: C, 69.90, 70.02; H, 3.92, 4.12; N, 18.71, 18.73.

The compound is an indicator, being bright yellow in dilute acid and deep burgundy in alkaline solutions.

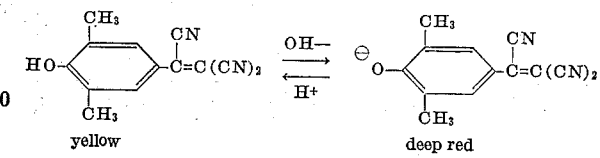

The ultraviolet absorption of the basic and acidic forms are determined by measurements in alcohol containing 5% triethylamine and 1% acetic acid, respectively.

UV: $\epsilon_{M538\ m\mu}$=49,000 (ethanol+5% triethylamine)
UV: $\epsilon_{M426\ m\mu}$=21,200 (ethanol+1% acetic acid)

*Example II*

To 888 parts of tetrahydrofuran is added 50 parts of 2,6-dimethylphenol and 21 parts of sodium methoxide. The mixture is stirred, and 50 parts of tetracyanoethylene is added in one portion. The solution is refluxed for four hours and cooled. Brilliant blue crystals which separate are collected on a filter and washed with cold ether; dry weight, 33 parts. A bright yellow solution is obtained when a small amount of this material (presumably the sodium salt of 2,6-dimethyl-4-tricyanovinylphenol) is dissolved in acetic acid.

The filtrate is evaporated to dryness, and the residue is washed by suspension in 359 parts of cold ether. The additional crystalline sodium salt of the tricyanovinylphenol is collected on a filter and washed with ether. It weighs 39 parts; total 72 parts (75% based on the sodium salt). The sodium salt is converted to 2,6-dimethyl-4-tricyanovinylphenol and is crystallized from 90% acetic acid ("Darco"). Air dried, the orange needles weigh 27 parts (31%); melting point, 177° C.

*Analysis.*—Visible:

$\epsilon_{M425\ m\mu}$=21,200 (ethanol+1% acetic acid)

It will be understood the above examples are merely illustrative and that the invention broadly comprises the process of reacting tetracyanoethylene with phenols containing at least one hydrogen bonded to annular carbon at a position other than meta in the phenol ring, to form C-tricyanovinylphenols.

The instant process is applicable to the reaction of tetracyanoethylene with, broadly, any phenol which contains at least one hydrogen bonded to annular carbon at either the ortho or para position to the hydroxy group. It is more practical to employ the tetracyanoethylene and phenol in substantially equimolecular proportions but the proportions used are not critical.

With phenols having only para-hydrogen or having both ortho and para-hydrogen available, C-tricyanovinylation by tetracyanoethylene occurs substantially exclusively at the para position to yield the para-tricyanovinylphenol. With phenols having only ortho-hydrogen available, tetracyanoethylene reacts to give the ortho-tricyanovinylphenol. When neither ortho nor para-hydrogen is present in the phenol, even though meta-hydrogen is present, tetracyanoethylene does not react to produce a meta-tricyanovinyl derivative under ordinary conditions.

The above situation may be specifically illustrated as follows: 2,6-dimethylphenol reacts with tetracyanoethylene to yield 2,6-dimethyl-4-tricyanovinylphenol. Para-methylphenol (para-cresol) and 2,4-dimethylphenol react with tetracyanoethylene to give, respectively, para-methyl-ortho-tricyanovinylphenol and 2,4-dimethyl-6-tricyanovinylphenol. 2,4,6-trimethylphenol shows no evidence of reacting with tetracyanoethylene to yield a meta-tricyanovinylphenol.

In the preparation of C-tricyanovinylphenols by the reaction of tetracyanoethylene with the herein defined phenols, it has been found that O-tricyanovinylphenols (tricyanovinylphenyl ethers) may also be formed. In general, this side reaction is the least evident when both ortho positions in a p-hydrogen phenol are blocked. Thus, 2,6-dimethylphenol reacts with tetracyanoethylene to give almost exclusively the p-tricyanovinyl derivative. With 2-methylphenol (o-cresol), the predominant product is the p-tricyanovinyl derivative but 2-methyl-6-tricyanovinylphenol and tricyanovinyl 2-methylphenyl ether are also formed. With phenol itself, p-tricyanovinylphenol, o-tricyanovinylphenol and tricyanovinyl phenyl ether are all formed, the predominant product being the ether.

Substituents on the phenols to be reacted with tetracyanoethylene other than those mentioned above may be varied widely. Particularly useful for reacting with tetracyanoethylene are the p-hydrogen phenols which contain as ortho and meta substituents hydrogen, alkoxyl, halogen or hydrocarbon radicals. This includes those phenols in which any two of the ortho and meta positions represent points of attachment for a hydrocarbon diradical.

Thus, the preferred phenols to be reacted with tetracyanoethylene to yield C-tricyanovinylphenols may be represented by the formula

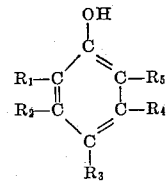

in which at least one of the odd numbered R's is hydrogen and the remaining R groups are hydrogen, alkoxyl, halogen or hydrocarbon, including the situation in which any two of the remaining R groups represent attachment for a divalent hydrocarbon radical.

The C-tricyanovinylphenols are highly colored crystalline solids which, presumably because of the presence of the phenolic hydroxyl group, are sensitive to the acidity or basicity of their environment. Thus, when they are transferred from an acidic to a basic medium, they show a sharp change in visible color or shade. This phenomenon makes the C-tricyanovinylphenols highly useful as chemical indicators.

The C-tricyanovinylphenols are particularly useful as dyes. They are substantive to a wide variety of natural and synthetic fibers and are of particular advantage in producing bright colors on cellulose acetate, "Dacron" polyester fiber and "Orlon" acrylic fiber. These compounds are also potent sources of hydrogen cyanide and as such are useful as insecticides.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing a C-tricyanovinylphenol which comprises reacting tetracyanoethylene with a phenol containing at least one hydrogen bonded to annular carbon at a position other than meta in the phenol ring.

2. Process of preparing a C-tricyanovinylphenol as set forth in claim 1 wherein said reaction is carried out at a temperature of 40° C. to 150° C.

3. Process of preparing a C-tricyanovinylphenol as set forth in claim 2 wherein said reaction is carried out in an inert liquid medium.

4. Process of preparing a C-tricyanovinylphenol as set forth in claim 2 wherein said reaction is carried out in the presence of an organic liquid inert to the reactants and capable of dissolving tetracyanoethylene.

5. Process of preparing a C-tricyanovinylphenol as set forth in claim 3 wherein said reaction is carried out under alkaline conditions.

6. Process of preparing a C-tricyanovinylphenol as set forth in claim 1 wherein said reaction is carried out in the presence of tetrahydrofuran at a temperature between about 40° C. and the boiling point of said tetrahydrofuran.

References Cited in the file of this patent

UNITED STATES PATENTS 2,264,354    Alder et al. _____ Dec. 2, 1941